Figure 1:
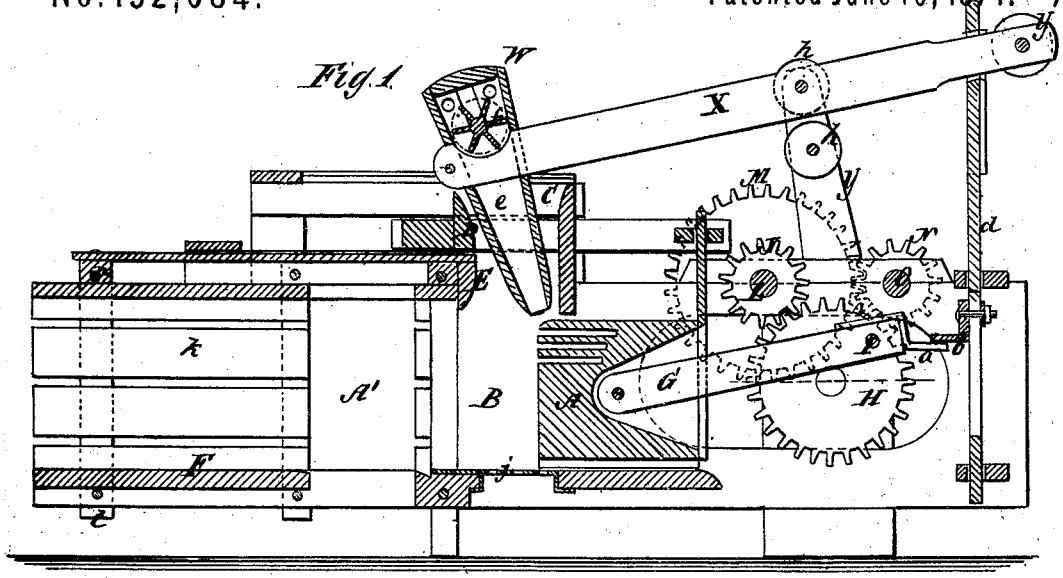

P. K. DEDERICK.
Cotton-Presses.

No. 152,084. Patented June 16, 1874.

Witnesses:
E. Wolff
[signature]

Inventor:
P. K. Dederick
Per [signature]
Attorneys.

AM. PHOTO-LITHOGRAPHIC CO. N.Y. (OSBORNE'S PROCESS.)

UNITED STATES PATENT OFFICE.

PETER K. DEDERICK, OF ALBANY, NEW YORK.

IMPROVEMENT IN COTTON-PRESSES.

Specification forming part of Letters Patent No. 152,084, dated June 16, 1874; application filed February 14, 1874.

*To all whom it may concern:*

Be it known that I, PETER K. DEDERICK, of Albany, in the county of Albany and State of New York, have invented a new and Improved Press for Cotton and Hay, of which the following is a specification:

My invention relates to continuous progressive presses, in which the hay is fed in at a hopper to a horizontally-reciprocating plunger or follower, and packed in at one end of the compressing-chamber, and forced out at the other; and it consists, first, of the connecting-rod, which works the follower geared between two cog-wheels in the same axis by a pin fitted in both wheels, and the two wheels geared with a counter-shaft and turning loosely on fixed studs, making a very simple and cheap double-geared connection. Second, it consists of a double gear for the driving-shaft, composed of two balance driving-pulleys, one on each side of the transmitting-pinion, connected to said shaft by friction devices, so adjusted that they will hold to work the press, but will slip on the shaft and allow the follower to stop in case it encounters any obstruction that would break the press if geared positively. Third, it consists of a feeder for packing the loose hay down through the hopper in front of the follower, mounted on a rock-lever above the follower and the hopper, which is forced down on the charges of hay as they are delivered into the hopper, when the follower goes back by the connecting-rod of the follower, and is raised up before the follower advances by weights. The means for forcing the feeder down consists of a tappet on the end of the connecting-rod of the follower, which comes in contact with another on a connecting-rod to the rock-lever when the follower-rod rises with the crank. Fourth, the invention consists of a fan-blower, in combination with the pressing-chamber, having a perforated bottom for blowing the dust from the hay out through the perforated bottom as the process of packing the hay goes on. The feeder is employed as the conductor of the blast from the fan into the pressing-chamber, said feeder being made hollow therefor; and in this example the fan-blower is located in the feeder and worked by belts from the driving-gear working over pulleys in the axis of the rock-lever, whereon the feeder swings, so as not to be interrupted in their action by the swinging; but it may be otherwise located, and the blast conducted to the feeder by a flexible tube. Fifth, the invention consists of a perforated metal bottom to the compressing-chamber for the heavy earthy matters, gravel, &c., to escape; and, sixth, the invention consists of an adjusting-screw mechanism, in combination with the discharge end of the box, for contracting the mouth as required, for regulating the extent of the compression of the hay.

Figure 3:
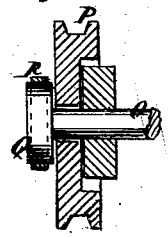
Figure 5:
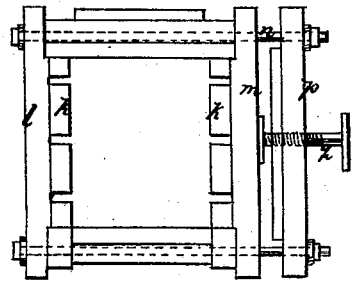
Figure 4:
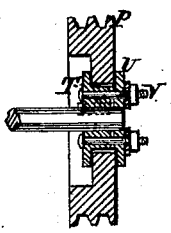
Figure 2:
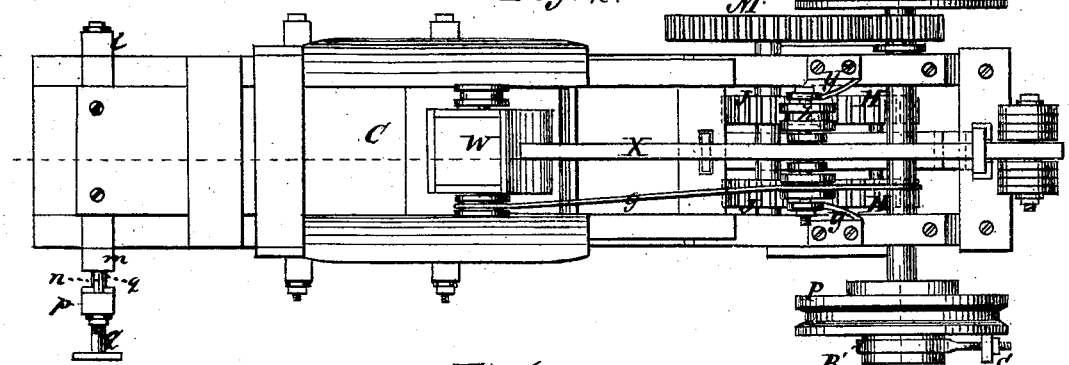
Figure 6:
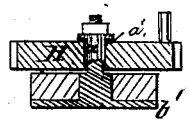

Figure 1 is a longitudinal sectional elevation of my improved press. Fig. 2 is a plan view. Figs. 3 and 4 are detail sections of the driving-wheels, showing different devices for connecting them to the driving-shaft. Fig. 5 is an end elevation of the press-box, showing the mode of regulating the compression. Fig. 6 is a detail, showing the way the wheels for working the connecting-rods are mounted.

Similar letters of reference indicate corresponding parts.

A represents the continuously-reciprocating follower; B, the pressing-chamber; C, the hopper through which the hay is fed into chamber B; D, an auxiliary condenser or follower for packing the charges of the hay into the throat E of the hopper; and F is the box along which the compressed hay is pressed out, the hay being separated into bales by follow-boards put in front of the follower from time to time, all as in other presses of this character heretofore patented by me.

I now propose, as a simple and cheap method of double-gearing the follower, to arrange its rod between two gear-wheels, H, in the same axis, but turning loosely on separate fixed studs cast on the attaching-plates $b'$, and connect it by a pin, I, fitted in holes bored through the wheels, and in a hole bored through the rod, by which I save the expense of a crank, and an expensive method of boxing the rod to the crank; also journal-bearings for a crank-shaft. These wheels I gear by pinions J with a counter-shaft L, which gears by a wheel, M, with a pinion, N, on the driving-shaft O, to allow the latter to be speeded up, so as to run the press with light belts, using two weighted belt-pulleys, P, for double-gearing and balancing the motion to make it steady and uniform; and I connect the pulleys to the shaft by friction devices, which may consist of a collar, Q, fast to the shaft, and a friction-strap, R, with tightening-nuts S, connected to the pulley, or a flanged collar, T, washer U, and tightening-bolts V, keyed to the shaft, or other equivalent devices.

W represents the feeder for pressing the hay down through the throat of the hopper. It is mounted on a rock-lever, X, pivoted on standard Y, over the driving-gear, and weighted at Y', to raise the feeder out of the way of the follower when it goes forward. The feeder is forced down on the hay when the follower goes back by the tappet $a$ on the end of the connecting-rod G, which strikes the stud $b$ on the connecting-rod $d$ of the lever X when the crank-pin I rises to drive the follower forward. The tappet escapes from the lug in time for the feeder to rise before the follower goes forward. The stud $b$ is adjustable to be set so as to vary the action of the feeder, as required. The feeder has a chamber, $e$, in which a fan is arranged for winnowing the hay to free it of the dust let free by the agitation to which it is subject in the process of packing. The fan is worked by one or more belts, $z$, passing from the driving-shaft up over guide-pulleys $a$ at the axis of the feeder-lever, to work without being affected by the vibrations of the lever. $j$ is a perforated metal bottom to the press-chamber B, to allow the heavy foreign matters to fall through and the dust to be blown out by the fan. The sides $k$ of the press case or box are free to move toward and from each other a little at the discharging end, and they are confined between post $l$ and a follower, $m$, connected by rod $n$, which also connects with the straining-post $p$, in which is an adjusting-screw, $q$, for forcing the sides together or allowing them to separate, according to the friction wanted upon the pressed material for producing the requisite compression. At A' is represented a large opening through both sides of the case and the bottom, for greater convenience in tying the bale and for other purposes.

The compression of the material being effected before it comes to these openings, it passes the openings without being affected by them.

Having thus described my invention, I claim as new and desire to secure by Letters Patent—

1. The wheels H H, located on independent shafts and connected by the pin I, in combination with the rod or pitman G, follower A, and pressing-chamber B, as and for the purpose specified.

2. The driving-pulleys or balance-wheels P P, connected to the driving-shafts by friction devices, in combination with double-geared crank-wheels H H and intermediate gear-wheels M N and shaft L, substantially as described.

3. The hollow feed-post or feeder $e$, in combination with a press-box having an outlet for the dust, substantially as shown and described.

4. The horizontal press-case, provided with a metal screen or perforated bottom, in combination with the traverser A of a continuously-reciprocating press, substantially as shown and described.

PETER K. DEDERICK.

Witnesses:
A. M. DEDERICK,
DAVID D. PIERE.